United States Patent
Janarthanam et al.

(10) Patent No.: US 10,411,313 B2
(45) Date of Patent: Sep. 10, 2019

(54) BIASING A BATTERY CELL

(71) Applicant: Ford Global Technologies, LLC, Dearborn, MI (US)

(72) Inventors: Suriyaprakash Ayyangar Janarthanam, Westland, MI (US); Bhaskara Boddakayala, Troy, MI (US); John Paul Gibeau, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 84 days.

(21) Appl. No.: 15/848,452

(22) Filed: Dec. 20, 2017

(65) Prior Publication Data

US 2018/0115030 A1  Apr. 26, 2018

Related U.S. Application Data

(62) Division of application No. 14/276,273, filed on May 13, 2014, now Pat. No. 9,887,439.

(51) Int. Cl.
*H01M 10/6554* (2014.01)
*H01M 10/625* (2014.01)
*H01M 10/613* (2014.01)
*H01M 2/10* (2006.01)
*H01M 10/6556* (2014.01)

(52) U.S. Cl.
CPC ..... *H01M 10/6554* (2015.04); *H01M 2/1077* (2013.01); *H01M 10/613* (2015.04); *H01M 10/625* (2015.04); *H01M 10/6556* (2015.04); *H01M 2220/20* (2013.01); *Y10T 29/49004* (2015.01)

(58) Field of Classification Search
CPC ............ H01M 10/613; H01M 10/625; H01M 10/6554; H01M 2/1077; H01M 2220/20; H01M 10/6556; Y10T 29/49004
USPC .......................................................... 429/120
See application file for complete search history.

(56) References Cited

U.S. PATENT DOCUMENTS

| | | |
|---|---|---|
| 5,234,779 A | 8/1993 | Mix et al. |
| 2006/0178051 A1 | 8/2006 | Hashida |
| 2008/0280198 A1 | 11/2008 | Kumar |
| 2011/0200862 A1 | 8/2011 | Kurosawa |
| 2013/0071705 A1 | 3/2013 | Frutschy et al. |
| 2013/0164592 A1 | 6/2013 | Maguire et al. |

(Continued)

FOREIGN PATENT DOCUMENTS

| | | |
|---|---|---|
| JP | 20080280198 | 5/2012 |
| WO | 2014050109 | 4/2014 |

*Primary Examiner* — Gary D Harris
(74) *Attorney, Agent, or Firm* — Carlson, Gaskey & Olds, P.C.

(57) ABSTRACT

An example electric vehicle battery assembly includes, among other things, a plurality of battery cells, a cold plate, and a cantilevered member to urge the plurality of battery cells toward the cold plate. An electric vehicle battery assembly according to another exemplary aspect of the present disclosure includes a battery cell, a cold plate, and a cantilevered member biasing a first side of the battery cell toward the cold plate to enhance thermal energy transfer between the battery cell and the cold plate. The cantilevered member biases the first side by pressing against an opposite, second side of the battery cell.

20 Claims, 6 Drawing Sheets

(56) References Cited

U.S. PATENT DOCUMENTS

2013/0189558 A1\* 7/2013 Haussmann ........ H01M 2/1083
  429/120
2013/0202940 A1 8/2013 Gendlin
2015/0287968 A1 10/2015 Maguire \* cited by examiner

BIASING A BATTERY CELL

CROSS-REFERENCE TO RELATED APPLICATION

This application is a divisional of U.S. patent application Ser. No. 14/276,273, which was filed 13 May 2014 and is incorporated herein by reference.

BACKGROUND

This disclosure relates to enhancing thermal performance at an interface between battery cells and a cold plate.

Example hybrid vehicles include hybrid electric vehicles (HEVs), plug-in hybrid electric vehicles (PHEVs), battery electric vehicles (BEVs), and fuel cell electric vehicles (FCVs). Generally, hybrid vehicles differ from conventional motor vehicles because hybrid vehicles are selectively driven using a battery-powered electric machine. Conventional motor vehicles, by contrast, rely exclusively on an internal combustion engine to drive the vehicle.

Battery packs used to power electric machines often require cooling. In some examples, battery cells interface with a cold plate. Liquid circulates through the cold plate. Thermal energy moves from the battery cells to the cold plate. The liquid carries the thermal energy away from the battery cells.

SUMMARY

An electric vehicle battery assembly according to another exemplary aspect of the present disclosure includes, among other things, a plurality of battery cells, a cold plate, and a cantilevered member to urge the plurality of battery cells toward the cold plate.

In another example of the foregoing assembly, the cantilevered member urges the plurality of battery cells downward.

In another example of any of the foregoing assemblies, the cantilevered member comprises a rail having a flange extending across an upwardly facing surface of the plurality of battery cells.

In another example of any of the foregoing assemblies, the plurality of battery cells are arranged along an axis, and the flange extends continuously along the axis from a first one of the plurality of battery cells to a second one of the plurality of battery cells.

In another example of any of the foregoing assemblies, the flange is a cantilever from the rail.

In another example of any of the foregoing assemblies, the cantilevered member comprises a plurality of fingers extending from a rail, at least a first one of the fingers to bias a first one of the plurality of battery cells, and a second one of the fingers to bias a second one of the plurality of battery cells.

In another example of any of the foregoing assemblies, the first finger and the second finger extend laterally outward from the rail.

In another example of any of the foregoing assemblies, the first finger and the second finger extend from the rail toward a median of the plurality of battery cells.

In another example of any of the foregoing assemblies, the assembly further comprises a battery cover. The cantilevered member is compressed between the battery cover and the battery cells.

In another example of any of the foregoing assemblies, the plurality of battery cells includes a first battery cell and a second battery cell along a first axis, and the first battery cell and a third battery cell along a second axis transverse to the first axis. The cantilevered member extends continuously along the first axis from the first battery cell to the second battery cell, and further extends continuously along the second axis from the first battery cell to the third battery cell.

In another example of any of the foregoing assemblies, the cantilevered member urges a first side of the plurality of battery cells against the cold plate. The cantilevered member presses against an opposite, second side of the plurality of battery cells.

In another example of any of the foregoing assemblies, the cantilevered member directly contacts the plurality of battery cells.

In another example of any of the foregoing assemblies, the plurality of battery cells are pressed against the cold plate by the cantilevered member such that the battery cell interfaces directly with the cold plate at a contiguous interface.

In another example of any of the foregoing assemblies, an entirety of the plurality of battery cells is situated between the cantilevered member and the cold plate.

In another example of any of the foregoing assemblies, the cold plate is disposed along a first side of the plurality of battery cells and the cantilevered member is disposed along second side of the plurality of battery cells. The plurality of battery cells are sandwiched between the cantilevered member and the cold plate.

In another example of any of the foregoing assemblies, the biasing is to enhance thermal energy transfer between the battery cell and the cold plate.

An electric vehicle battery assembly according to another exemplary aspect of the present disclosure includes, among other things, a battery cell, a cold plate, and a cantilevered member biasing a first side of the battery cell toward the cold plate to enhance thermal energy transfer between the battery cell and the cold plate. The cantilevered member biases the first side by pressing against an opposite, second side of the battery cell.

In another example of the foregoing assembly, the cantilevered member directly contacts the battery cell.

Another example of any of the foregoing assemblies includes a resilient member between a battery cover and a battery cell to provide some of the biasing.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
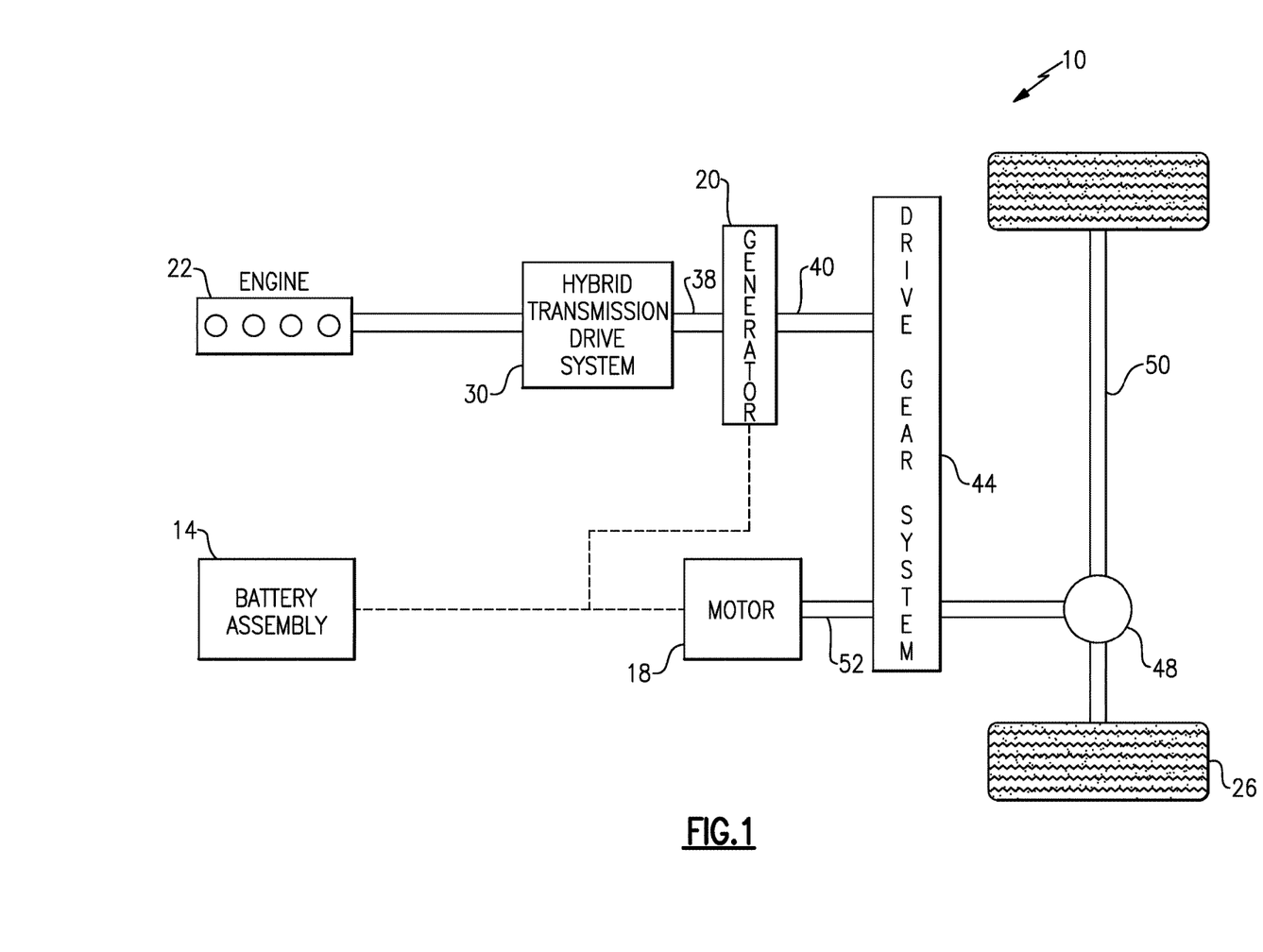
FIG. 1 illustrates a schematic view of an example hybrid transmission for an electric vehicle.

FIG. 1 schematically illustrates a powertrain 10 for an electric vehicle. The powertrain 10 includes a battery assembly 14, an electric machine (motor) 18, an electric machine (generator) 20, and an internal combustion engine 22. In some examples, the electric machines 18 & 20 may be combined as a motor/generator.

Although depicted as a hybrid electric vehicle (HEV), it should be understood that the concepts described herein are not limited to HEVs and could extend to other electrified vehicles, including, but not limited to, plug-in hybrid electric vehicles (PHEVs), battery electric vehicles (BEVs), and fuel cell vehicles (FCVs).

In one embodiment, the powertrain 10 is a power-split powertrain system that employs a first drive system and a second drive system. The first drive system includes a combination of the engine 22 and the generator 20. The second drive system includes at least the motor 18, the generator 20, and a battery 14. In this example, the second drive system is considered an electric drive system of the powertrain 10. The first and second drive systems generate torque to drive one or more sets of vehicle drive wheels 26 of the electric vehicle.

The engine 22, which is an internal combustion engine in this example, and the generator 20 may be connected through a hybrid transmission drive system 30, such as a planetary gear set. Of course, other types of power transfer unit drive systems, including other gear sets and transmissions, may be used to connect the engine 22 to the generator 20. In one non-limiting embodiment, the hybrid transmission drive system 30 is a planetary gear set that includes a ring gear, a sun gear, and a carrier assembly.

The generator 20 can be driven by engine 14 through the hybrid transmission drive system 30 to convert kinetic energy to electrical energy. The generator 20 can alternatively function as a motor to convert electrical energy into kinetic energy, thereby outputting torque to a shaft 38 connected to the hybrid transmission drive system 30. Because the generator 20 is operatively connected to the engine 22, the speed of the engine 22 can be controlled by the generator 20.

The hybrid transmission drive system 30 and generator 20 may be connected to a shaft 40, which is connected to vehicle drive wheels 26 through a second power transfer unit, such as a drive gear system 44 including a gear set having a plurality of gears. Other power transfer units may also be suitable. The gears of the drive gear system 44 transfer torque from the engine 22 to a differential 48 to ultimately provide traction to the vehicle drive wheels 26. The differential 48 may include a plurality of gears that enable the transfer of torque to the vehicle drive wheels 26. In this example, the drive gear system 44 is mechanically coupled to an axle 50 through the differential 48 to distribute torque to the vehicle drive wheels 26.

The motor 18 can also be employed to drive the vehicle drive wheels 26 by outputting torque to a shaft 52 that is also connected to the drive gear system 44. In one embodiment, the motor 18 and the generator 20 cooperate as part of a regenerative braking system in which both the motor 18 and the generator 20 can be employed as motors to output torque. For example, the motor 18 and the generator 20 can each output electrical power to the battery 14.

The battery 14 is an example type of electric vehicle battery assembly. The battery 14 may incorporate a high voltage battery that is capable of outputting electrical power to operate the motor 18 and the generator 20. Other types of energy storage devices and/or output devices can also be used with the electric vehicle having the powertrain 10. The battery 14 generates significant thermal energy.

Figure 2:
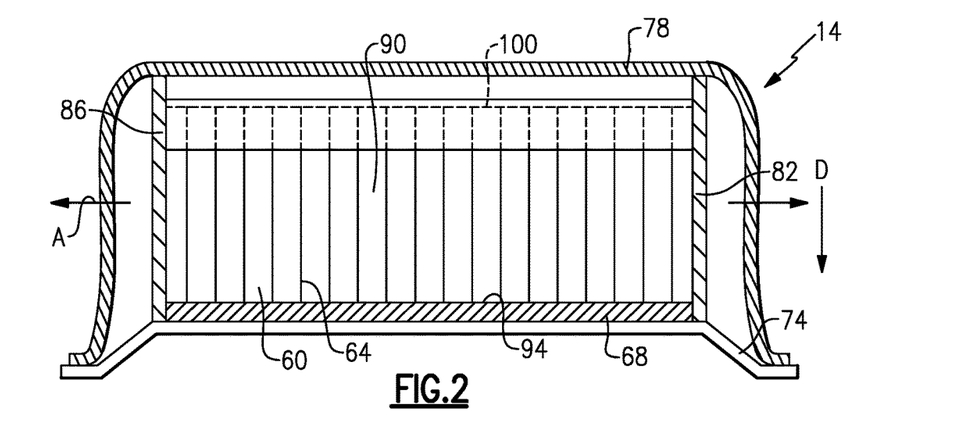
FIG. 2 shows a side view of the example battery assembly of FIG. 1.
Figure 3:
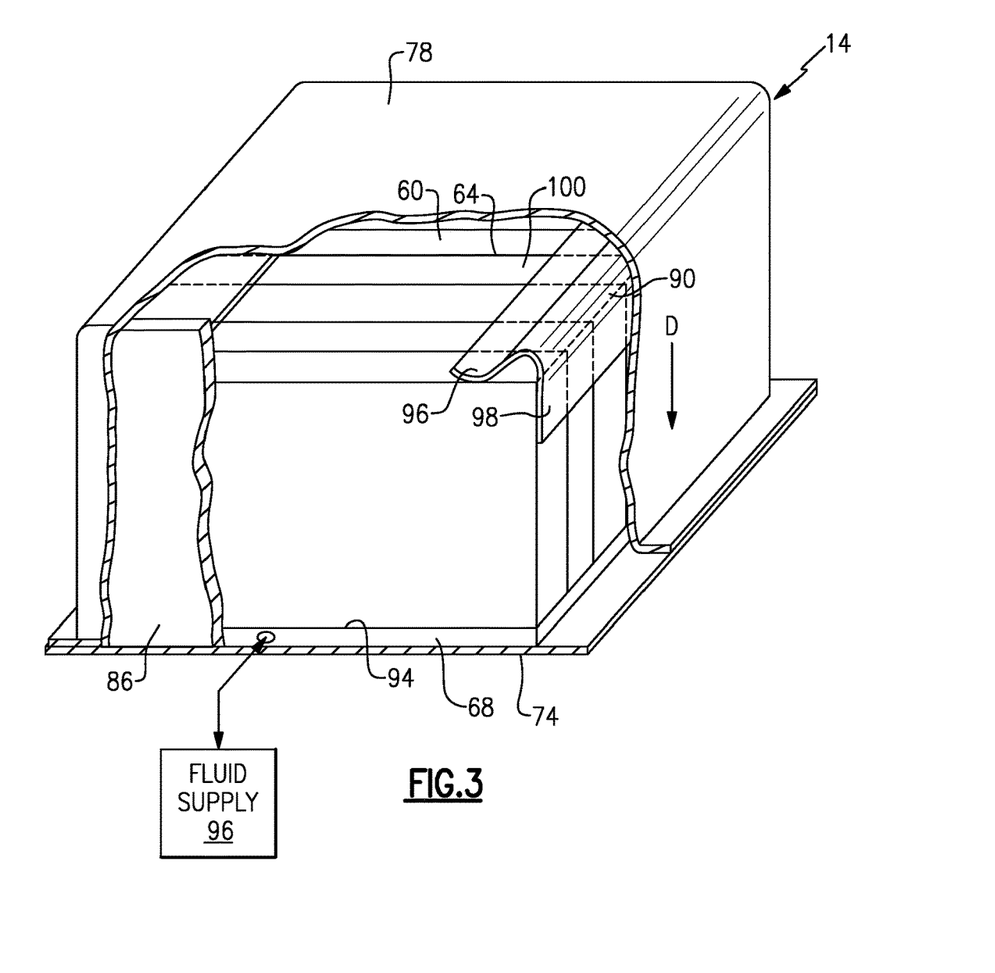
FIG. 3 shows a perspective, partially section view of the battery assembly of FIG. 1.

Referring now to FIGS. 2 and 3 with continued reference to FIG. 1, the battery assembly 14 includes a plurality of individual battery cells 60 extending along an axis A. Separators 64 are positioned axially between the battery cells 60.

The battery assembly 14 further includes a cold plate 68, a battery tray 74, a battery cover 78, a first endplate 82 a second endplate 86, and a biasing device 90.

The battery cells 60 and the separator 64 are compressed along the axis A by the endplates 82 and 86. In other examples, the battery cells 60 are not compressed along the axis A, but are instead placed between the endplates 82 and 86 without compression. The battery cells 60, the separator 64 and the endplates 82 and 86 mount on top of the battery tray 74. The battery cover 78 can be secured to the endplates 82 and 86.

The battery cells 60 and the separators 64 are disposed on the cold plate 68. The battery cells 60 and the separators 64 meet the cold plate 68 at an interface 94. A layer of material (not shown) may be used at the interface 94. Examples of such materials include ceramic doped rubber pads or silicone pads.

Fluid, such as a liquid coolant, circulates through channels in the cold plate 68 from a fluid supply 96 outside the cold plate 68. During operation, thermal energy from the battery cells 60 moves through the interface 94 to the cold plate 68. The fluid within the cold plate 68 carries this thermal energy away from the battery assembly 14.

The biasing device 90 is used to urge the battery cells 60 toward the cold plate 68, which enhances thermal energy transfer between the battery cells 60 and the cold plate 68. The biasing device 90 urges the battery cells 60 downward in a direction D, but could be used in other orientations in other examples.

In this example, the biasing device 90 is secured to the endplates 82 and 86 and has a cantilevered design. Many techniques, such as welding, could be used to secure the biasing device 90 while permitting function of the biasing device 90. More specifically, the biasing device 90 includes a flange 96 extending from a rail 98. The flange 96 extends across an upwardly facing surface 100 of the cells 60 and presses directly against the upwardly facing surface 100 in this example.

When the battery assembly 14 is assembled, the biasing device 90 is flexed and the flange 96 is moved against the upwardly facing surface 100. This causes the biasing device 90 to exert a biasing force downward against at least the battery cells 60. The biasing force presses the battery cells 60 against the cold plate 68 to enhance the effectiveness of thermal energy transfer from the cells 60 to the cold plate 68 through the interface 94.

Two of the biasing device 90 are used in this example. One at each laterally outboard side of the cells 60.

Figure 4:
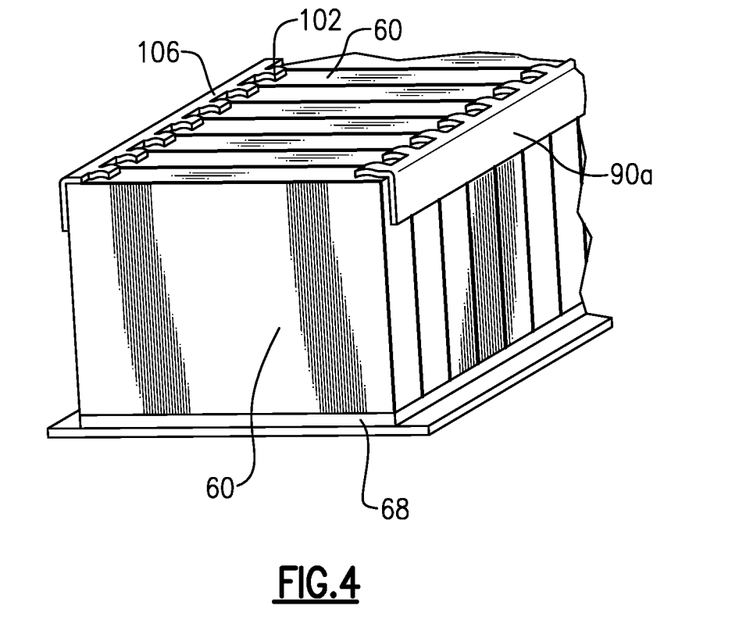
FIG. 4 shows another example battery assembly for use in the powertrain of FIG. 1

Referring now to FIG. 4, in another example embodiment, the biasing device 90a includes a plurality of fingers 102, rather than the flange 96 (FIG. 3), extending from a rail 106. Each of the fingers 102 correspond with one of the battery cells 60. In other examples, one of the fingers 102 can extend along the axis across more than one of the battery cells 60.

In this example, two of the biasing devices 90a are used so that each of the cells 60 is pressed downward by two fingers 102 at opposing laterally outward sides of the battery cell 60. Utilizing the fingers 102, rather than, for example, the flange 96 of FIGS. 2 and 3, ensures that each of the cells 60 receives a more individualized downward push.

Figure 5:
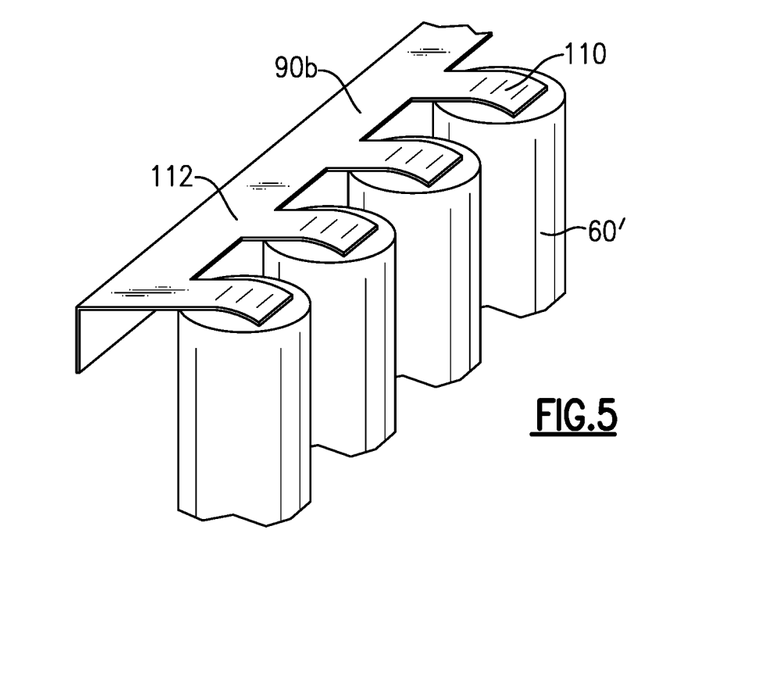
FIG. 5 shows a portion of another example battery assembly for use in the powertrain of FIG. 1.

Referring now to FIG. 5, another example biasing device 90b includes fingers 110 extending from a rail 112. The biasing device 90b is used within a battery assembly having cylindrical cells 60'. Each of the fingers 110 presses against one of the battery cells 60'. Each of the battery cells 60' is pushed by a single one of the fingers 110 toward a cold plate (not shown).

Figure 6:
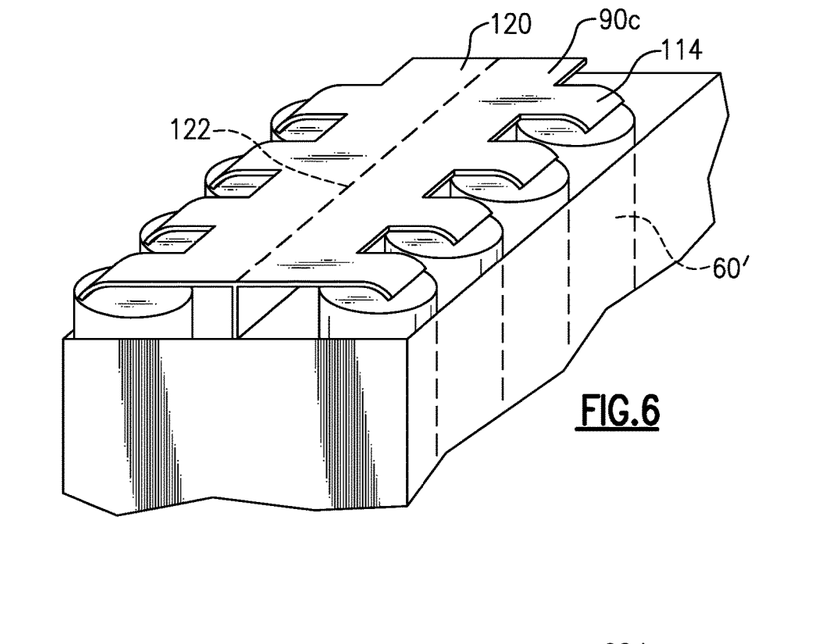
FIG. 6 shows another example battery assembly for use in the powertrain of FIG. 1.

Referring now to FIG. 6, another example biasing device 90c includes fingers 114 extending from a central rail structure 120. The biasing device 90c is used within a battery assembly having cylindrical cells 60'. The fingers 114 extend laterally outward away from a median of a battery assembly. Each of the fingers 114 presses against one of the battery cells 60'. Each of the battery cells 60' is pushed by a single one of the fingers 110 toward a cold plate (not shown).

The central rail structure 120 can provide a base for fingers 114 extending laterally outward from both sides. In some examples, the base is divided along line 122, such that the biasing device 90c comprises two separate structures. One of the structures provides the base and the fingers for a first lateral side. The other of the components provides the base and the fingers for an opposing, second lateral side.

Figure 7:
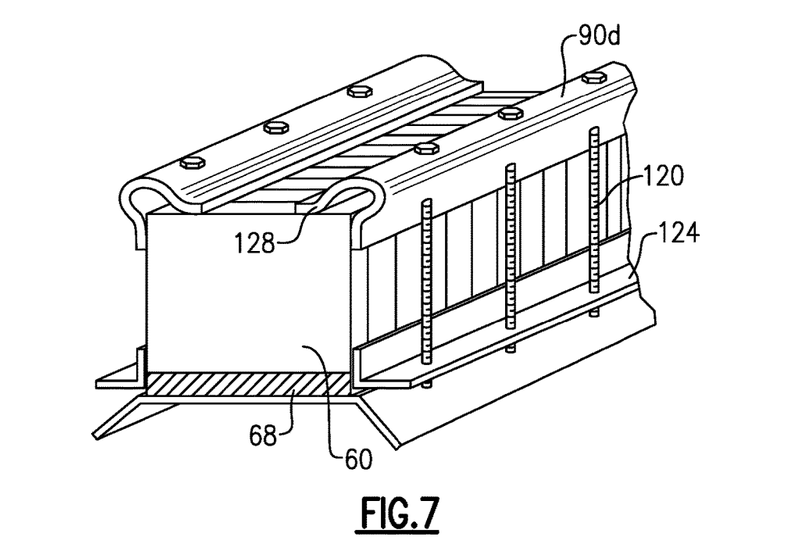
FIG. 7 shows yet another example battery assembly for use in the powertrain of FIG. 1.

Referring now to FIG. 7, an example biasing device 90d is urged downward by attachments 120 to a bottom side rail 124, rather than by an attachment to end plate. The attachments 120 may be a threaded attachment, or a clamp, for example.

In this example, the attachments 120 are tightened to draw the biasing device 90d downward, which causes a flange 128 of the biasing device 90d to flex and force the battery cells 60 against the cold plate 68.

Figure 8:
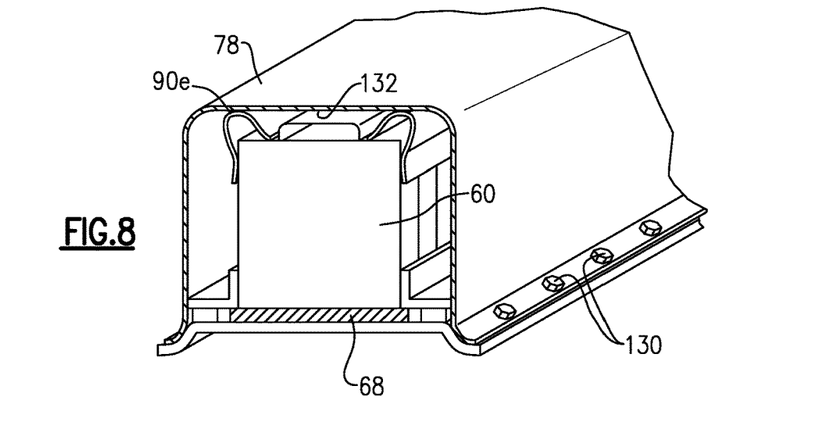
FIG. 8 shows yet another example battery assembly for use in the powertrain of FIG. 1

Referring now to FIG. 8, in yet another example, a biasing device 90e may be forced downward against battery cells 60 with the cover 78. As the cover 78 is drawn downward by securing attachments 130, an underside surface 132 of the cover 78 contacts the biasing devices 90e and causes them to flex downward against the battery cells 60, which forces the battery cell 60 downward toward the cold plate 68.

Figure 9:
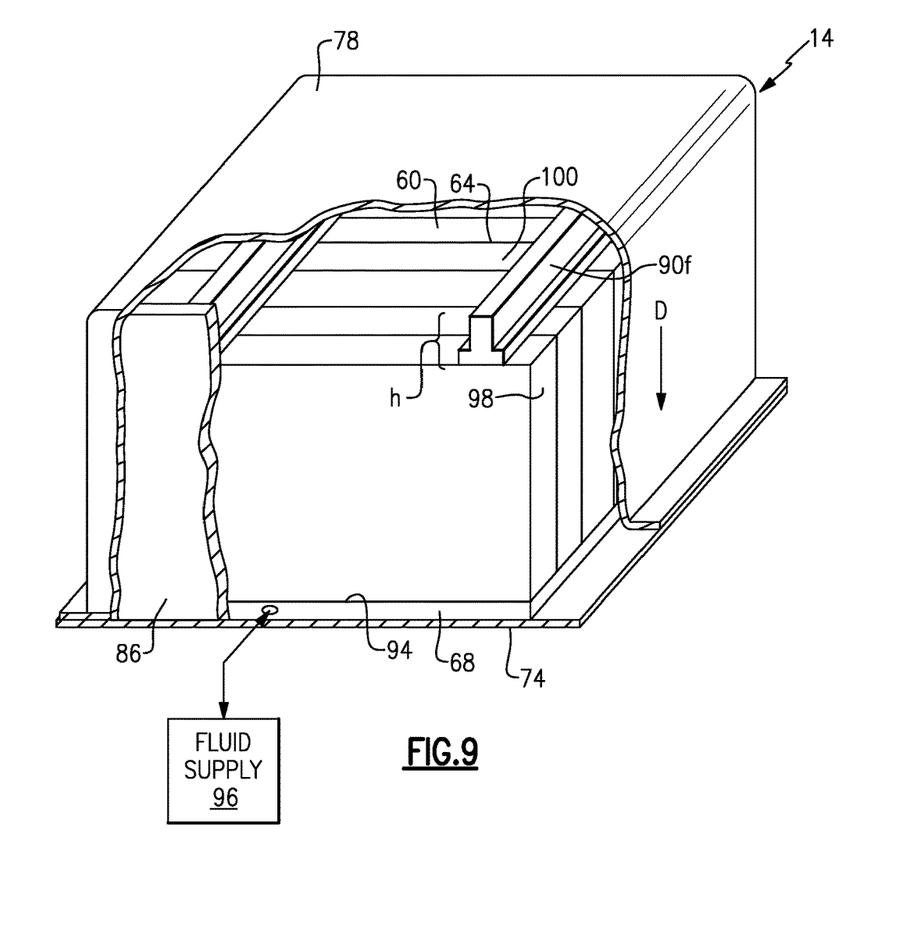
FIG. 9 shows yet another example battery assembly for use in the powertrain of FIG. 1.

Referring now to FIG. 9, in yet another example, the biasing device 90f is a formed piece placed between the cover 78 and the batter cells 60. The height h of the biasing device 90f is designed such that the battery cover 78 will compress the biasing device 90f against the cells 60 when the cover 78 is an installed position.

The biasing device 90f may be a rubber molded part. In this example, the cross-section of the biasing device 90f has a general "T" shape. The biasing device 90f may be integrated into the cover 78, which can reduce assembly time associated with securing the cover. The biasing device 90f could be materials other than rubber, such as a plastic.

Figure 10:
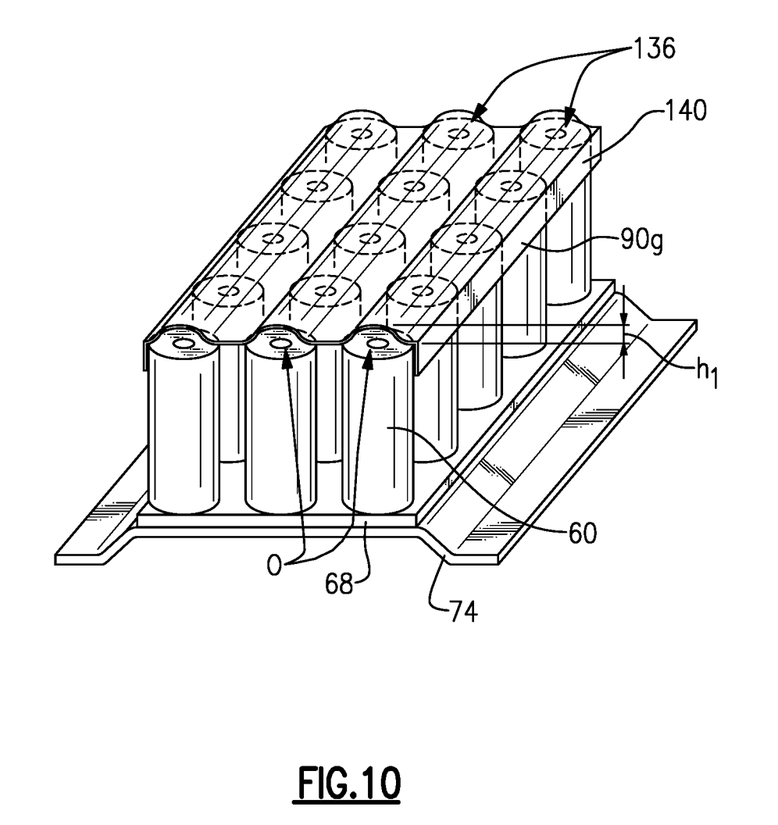
FIG. 10 shows yet another example battery assembly for use in the powertrain of FIG. 1.

Referring now to FIG. 10, in yet another example, the biasing device 90g has the form of a corrugated plate. The height hi of the biasing device 90g is designed such that the battery cover (not show) will compress the biasing device 90g against the cells 60. In this example, the cells 60 are cylindrical and separated from each other with a separator assembly.

The biasing device 90g has corrugations 136, which provide protected open areas O across the upper surfaces of the cells 60. The open areas O can be used to make electric connections to the cells 60, for example. The open areas O could be used for wire routing and other connections as well.

The biasing device 90g contacts the upper surfaces of the cells 60 at the edges of the open areas O. This applies downward pressure to the cells 60 while leaving the open areas O free for connections to terminals of the cells, etc.

The biasing device 90g may include flanges 140 at lateral sides. The flanges 140 hold the cells 60 laterally. The biasing device 90g can be mounted to end plates (not shown) to hold its position.

Features of the disclosed examples include a biasing device within a battery assembly that enhances contact between battery cells and a cooling plate to reduce the likelihood of an over temperature condition in the battery cells. The biasing device enhances thermal conductivity from the cells to the cold plate, which, in turn, enhances the cell utilization and improves overall efficiency of the assembly.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. An electric vehicle battery assembly, comprising:
   a plurality of battery cells;
   a cold plate; and
   a cantilevered member to urge the plurality of battery cells toward the cold plate.

2. The assembly of claim 1, wherein the cantilevered member urges the plurality of battery cells downward.

3. The assembly of claim 1, wherein the cantilevered member comprises a rail having a flange extending across an upwardly facing surface of the plurality of battery cells.

4. The assembly of claim 3, wherein the plurality of battery cells are arranged along an axis, and the flange extends continuously along the axis from a first one of the plurality of battery cells to a second one of the plurality of battery cells.

5. The assembly of claim 3, wherein the flange is a cantilever from the rail.

6. The assembly of claim 1, wherein the cantilevered member comprises a plurality of fingers extending from a rail, at least a first one of the fingers to bias a first one of the plurality of battery cells, and a second one of the fingers to bias a second one of the plurality of battery cells.

7. The assembly of claim 6, wherein the first finger and the second finger extend laterally outward from the rail.

8. The assembly of claim 6, wherein the first finger and the second finger extend from the rail toward a median of the plurality of battery cells.

9. The assembly of claim 1, further comprising a battery cover, wherein the cantilevered member is compressed between the battery cover and the battery cells.

10. The assembly of claim 9, wherein the plurality of battery cells includes a first battery cell and a second battery cell along a first axis, and the first battery cell and a third battery cell along a second axis transverse to the first axis, wherein the cantilevered member extends continuously along the first axis from the first battery cell to the second battery cell, and further extends continuously along the second axis from the first battery cell to the third battery cell.

11. The assembly of claim 1, wherein the cantilevered member urges a first side of the plurality of battery cells against the cold plate, the cantilevered member pressing against an opposite, second side of the plurality of battery cells.

12. The assembly of claim 1, wherein the cantilevered member directly contacts the plurality of battery cells.

13. The assembly of claim 1, wherein the plurality of battery cells are pressed against the cold plate by the cantilevered member such that the battery cell interfaces directly with the cold plate at a contiguous interface.

14. The assembly of claim 1, wherein an entirety of the plurality of battery cells is situated between the cantilevered member and the cold plate.

15. An electric vehicle battery assembly, comprising:
a plurality of battery cells;
a cold plate; and
a cantilevered member to urge the plurality of battery cells toward the cold plate,
wherein the cold plate is disposed along a first side of the plurality of battery cells and the cantilevered member is disposed along a second side of the plurality of battery cells, the plurality of battery cells sandwiched between the cantilevered member and the cold plate.

16. An electric vehicle battery assembly, comprising:
a battery cell;
a cold plate; and
a cantilevered member biasing a first side of the battery cell toward the cold plate to enhance thermal energy transfer between the battery cell and the cold plate, the cantilevered member biasing the first side by pressing against an opposite, second side of the battery cell.

17. The assembly of claim 16, wherein the cantilevered member directly contacts the battery cell.

18. The assembly of claim 16, further comprising a resilient member between a battery cover and a battery cell to provide some of the biasing.

19. The assembly of claim 16, wherein an entirety of the battery cell is situated between the cantilevered member and the cold plate.

20. The assembly of claim 16, wherein the cold plate is disposed along the first side battery cell and the cantilevered member is disposed along the second side of the battery cell, the battery cell sandwiched between the cantilevered member and the cold plate.

* * * * *